United States Patent [19]

Aggarwal et al.

[11] Patent Number: 4,604,738

[45] Date of Patent: Aug. 5, 1986

[54] METHOD AND APPARATUS FOR CLASSIFICATION OF A MOVING TERRESTRIAL VEHICLE AS LIGHT OR HEAVY

[75] Inventors: Raj Aggarwal, Wayzata; Bindinganavle R. Suresh, New Brighton, both of Minn.

[73] Assignee: Honeywell Inc., Minneapolis, Minn.

[21] Appl. No.: 350,926

[22] Filed: Feb. 22, 1982

[51] Int. Cl.⁴ .................................................. G01V 1/28
[52] U.S. Cl. ..................................... 367/135; 181/401; 367/191; 340/566
[58] Field of Search ............... 367/191, 135, 136, 901; 340/566; 181/122, 401

[56] References Cited

U.S. PATENT DOCUMENTS

| | | | |
|---|---|---|---|
| 3,585,581 | 6/1971 | Aune | 340/566 |
| 3,824,532 | 7/1974 | Vandierendonck | 340/38 S |
| 3,891,865 | 6/1975 | Picard et al. | 340/566 |
| 3,903,512 | 9/1975 | Laymon | 340/261 |
| 3,984,804 | 10/1976 | Herring et al. | 340/17 R |
| 3,995,223 | 11/1976 | Gimber et al. | 328/110 |
| 4,081,785 | 3/1978 | Ravis et al. | 367/135 |
| 4,090,180 | 5/1978 | Barowitz et al. | 340/261 |
| 4,158,832 | 6/1979 | Barnes, Jr. et al. | 340/38 S |
| 4,271,491 | 6/1981 | Simpson | 367/136 |
| 4,337,528 | 6/1982 | Clinard et al. | 367/136 |

OTHER PUBLICATIONS

Sheriff, "Encyclopedic Dictionary of Exploration Geophysics", Published by the Soc. of Exploration Geophysicists, Tulsa, Oklahoma, (1973).

Primary Examiner—Thomas H. Tarcza
Assistant Examiner—Ian J. Lobo
Attorney, Agent, or Firm—William T. Udseth

[57] ABSTRACT

The subject invention discloses a conventional method and apparatus for classifying terrestrial moving vehicles in which the seismic signal generated by the vehicle is broken into its Rayleigh and acoustically coupled components. The ratio of the Rayleigh component to the acoustically coupled component is used to classify the vehicle as heavy or light.

2 Claims, 5 Drawing Figures

FREQUENCY IN Hz

METHOD AND APPARATUS FOR CLASSIFICATION OF A MOVING TERRESTRIAL VEHICLE AS LIGHT OR HEAVY

This invention relates to a novel method and apparatus for classifying terrestrial moving objects as relatively heavy or relatively light.

BACKGROUND

There have been a number of proposals for classifying vehicles and other similar terrestrial moving objects as relatively heavy or relatively light based on an analysis of the seismic vibration caused by the vehicle as it moves along the ground. Similarly, the acoustic signals generated by moving vehicles also have been used to determine certain gross characteristics, such as heavy vs. light. The following list of patents shows certain embodiments of these proposals. The differences between these proposals and applicant's invention will be discussed in a prior art statement, filed in conjunction with this application.

Patent Numbers 3,903,512
4,158,832
3,824,532
3,585,581
3,995,223
3,984,804
4,081,785

Generally, the problem of distinguishing between heavy and light vehicles is a classic binary problem and has been investigated for a long time. Past attempts at seismic-acoustic classifiers have not been altogether satisfactory. For example, one past attempt uses a seismic thresholding technique. Here a coarse spectral analysis of the seismic signal is integrated over a period of time to compute the average energy in each spectral band. If the energy in any of the bands is greater than a certain threshold the target is classified as heavy; if it is not, it is classified as light. Since any practical system must accommodate vehicles passing at various distances from the seismic transducer, this technique is limited in that it often misclassifies light vehicles as being heavy when the vehicle passes in close proximity to the transducer.

An object of this invention is the provision of a moving vehicle classifier in which signature signal energies related to specific physical features are normalized in order to prevent a light vehicle at close range from being misclassified.

SUMMARY OF THE INVENTION

Briefly, this invention contemplates the provision of a moving vehicle classification system in which the vehicle is classified according to the ratio of the Rayleigh seismic signal and the acoustically coupled seismic signal which it generates. A Rayleigh component is generated by direct mechanical coupling between the vehicle and the ground surface. Consequently, the Rayleigh component is a function of the weight of the vehicle, and in a sense is a "genuine" seismic signal. In contrast, an acoustically coupled seismic signal is generated even if there is no direct contact between the source and the ground. In a vehicle, seismic signals arise as a consequence of the continuous exchange of energy into the ground at the air-earth interface. If ratio of the energy in the Rayleigh seismic energy to that of the acoustically coupled seismic energy exceeds a certain threshold, which can be easily determined empirically, the vehicle is classified heavy and if it does not it is classified as light. Of course ratio of the energy of the Rayleigh seismic signal to the energy of the total seismic signal can be used to produce the same result.

DESCRIPTION OF THE DRAWINGS

A better understanding of the present invention may be had when the following detailed description is read in connection with the accompanying drawings, in which.

DESCRIPTION OF THE PREFERRED EMBODIMENT

Figure 1:
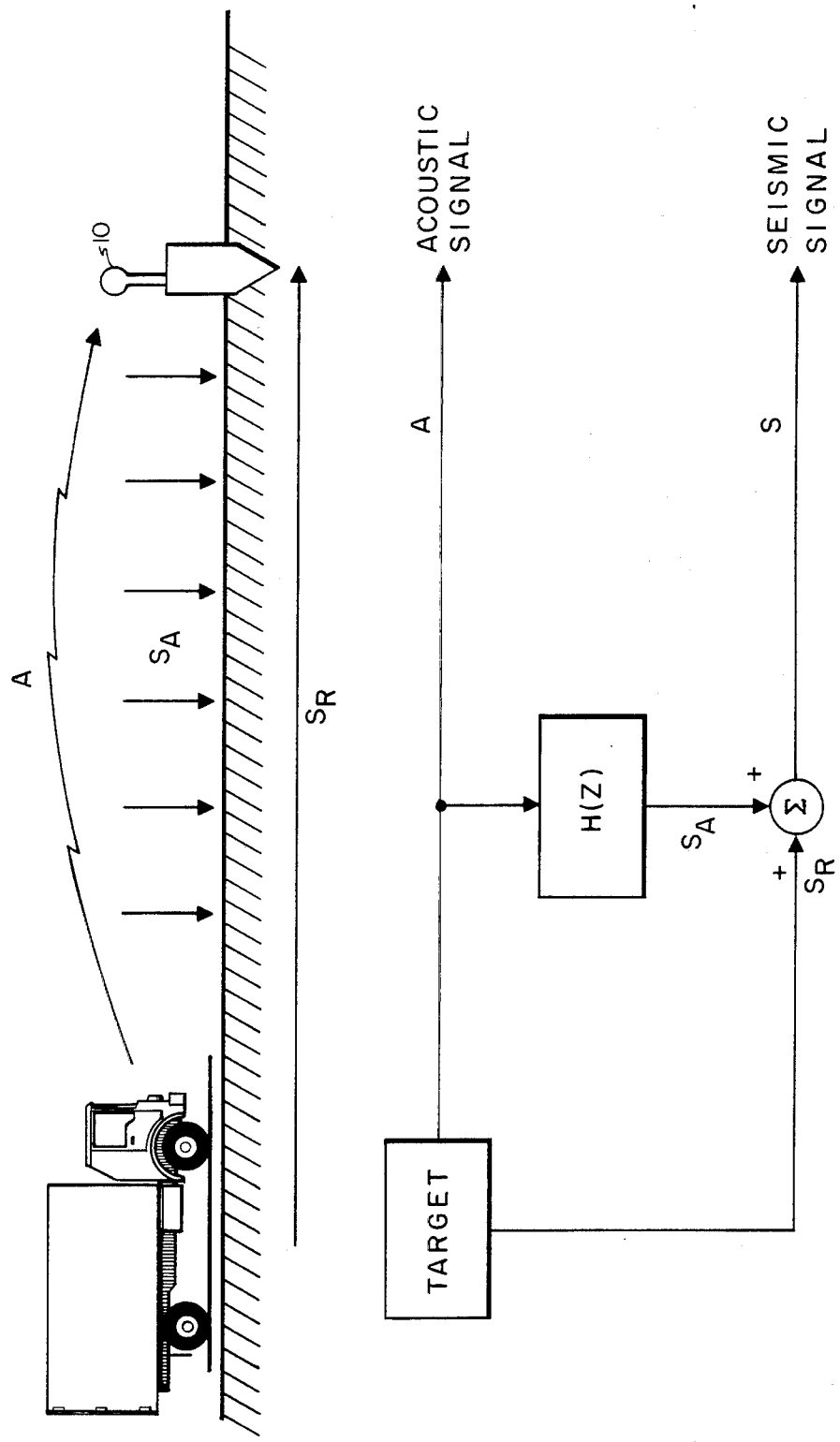
FIG. 1 is a schematic drawing useful in explaining the various seismic and acoustic signals emitted from a vehicle.

Referring now to FIG. 1, it will be appreciated that any vehicle generates varying amounts of Rayleigh seismic ($S_R$) and acoustically coupled seismic ($S_A$) signals which will be detected by a suitable seismic detector 10, such as a geophone. As previously mentioned in the Rayleigh component is generated by direct mechanical coupling between the vehicle and the ground surface. Consequently, the magnitude of this component is a function of the weight of the vehicle. This Rayleigh wave is a surface wave and is usually confined to a depth of about one wave length below the surface of the ground. The Rayleigh seismic signal typically propagates at a velocity of about one-third to one-half the velocity of propagation of sound in air.

The vehicle also generates an acoustic signal (A) which is coupled to the earths surface and propagates an acoustically coupled seismic signal. This acoustically coupled seismic signal is generated irrespective of whether or not there is direct contact between the source and the ground surface. For example, vehicle engine noise is sufficient to generate a strong acoustically coupled seismic signal. As illustrated in FIG. 1, the acoustically coupled seismic signal arises as a consequence of the continuous exchange of energy into the ground at the air-earth interface, that is, it arises due to the vibration of the ground in sympathy with the impinging sound wave. The acoustically coupled seismic wave propagates with approximately same velocity as that of sound in air.

FIG. 1 also shows a mathematical model of the physical system. The phenomenon which generates the acoustically coupled seismic wave is simulated by a linear time invariant dynamic system, with the transfer function H(Z). The acoustically coupled seismic wave $S_A$, is added to the Rayleigh wave $S_R$ to generate the total seismic signal S. Thus, S equals $S_A + S_R$.

Figure 2:
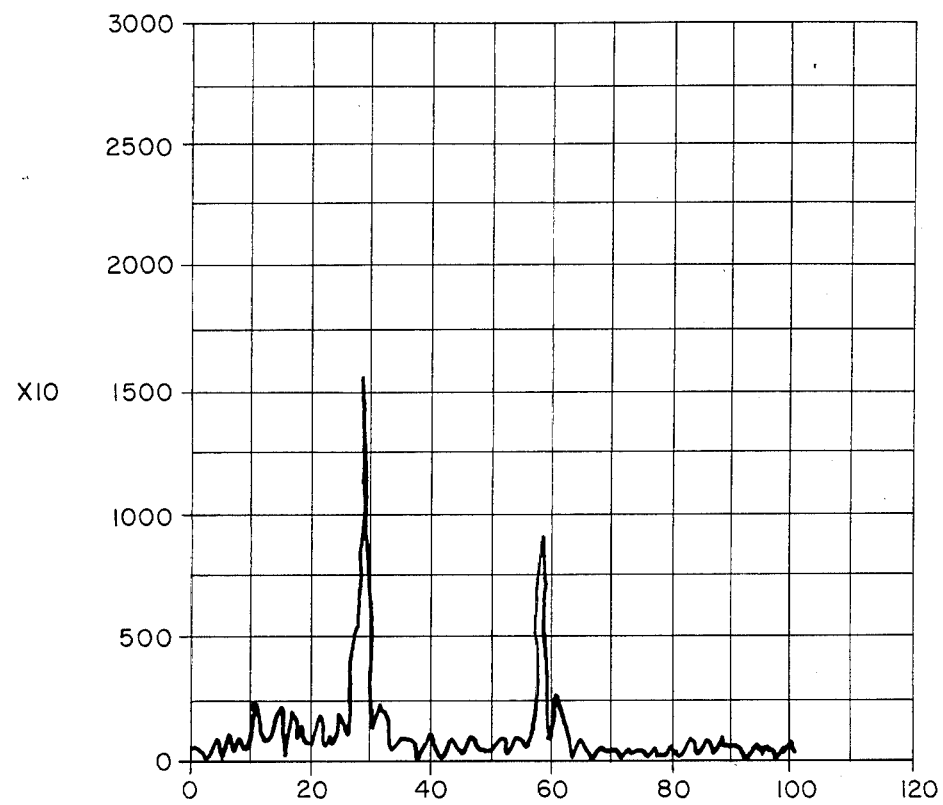
FIG. 2 is a graph of a typical seismic spectrum of a moving vehicle.
Figure 3:
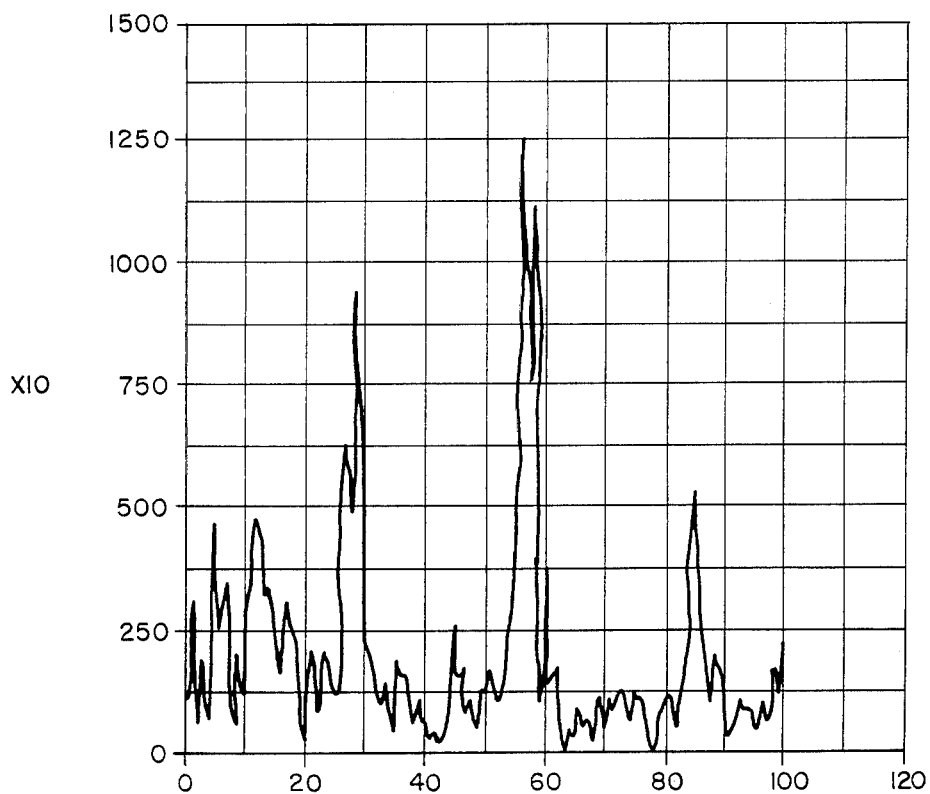
FIG. 3 is a typical acoustic spectrum of a moving vehicle.

FIGS. 2 and 3 illustrate respectively the total seismic wave signal and the accompanying acoustic wave signal spectra recorded by adjacent transducers for a typical vehicle. It should be noted that both the seismic and acoustic signals display strong peaks at 29 hertz and 58 hertz, indicating a strong acoustically coupled component in the seismic signal. For heavy vehicles, the Rayleigh seismic component will be much larger than the acoustically coupled seismic component; in contrast, for light vehicles, the seismic signal will largely consist of the acoustically coupled component. This is due, of course, to the fact that the Rayleigh component of the seismic signal is directly related to vehicle weight. Thus, the ratio of the Rayleigh seismic energy to the acoustically coupled seismic energy or alternatively the total seismic energy provides a reliable system for classifying vehicles as heavy or light. For example, if the ratio of the energy of the Rayleigh seismic $S_R$ to the ratio of the energy of the acoustically coupled seismic $S_A$ exceeds a suitable threshold T the vehicle is classified as heavy, and if it is less than the threshold the vehicle is classified as light.

Figure 4:
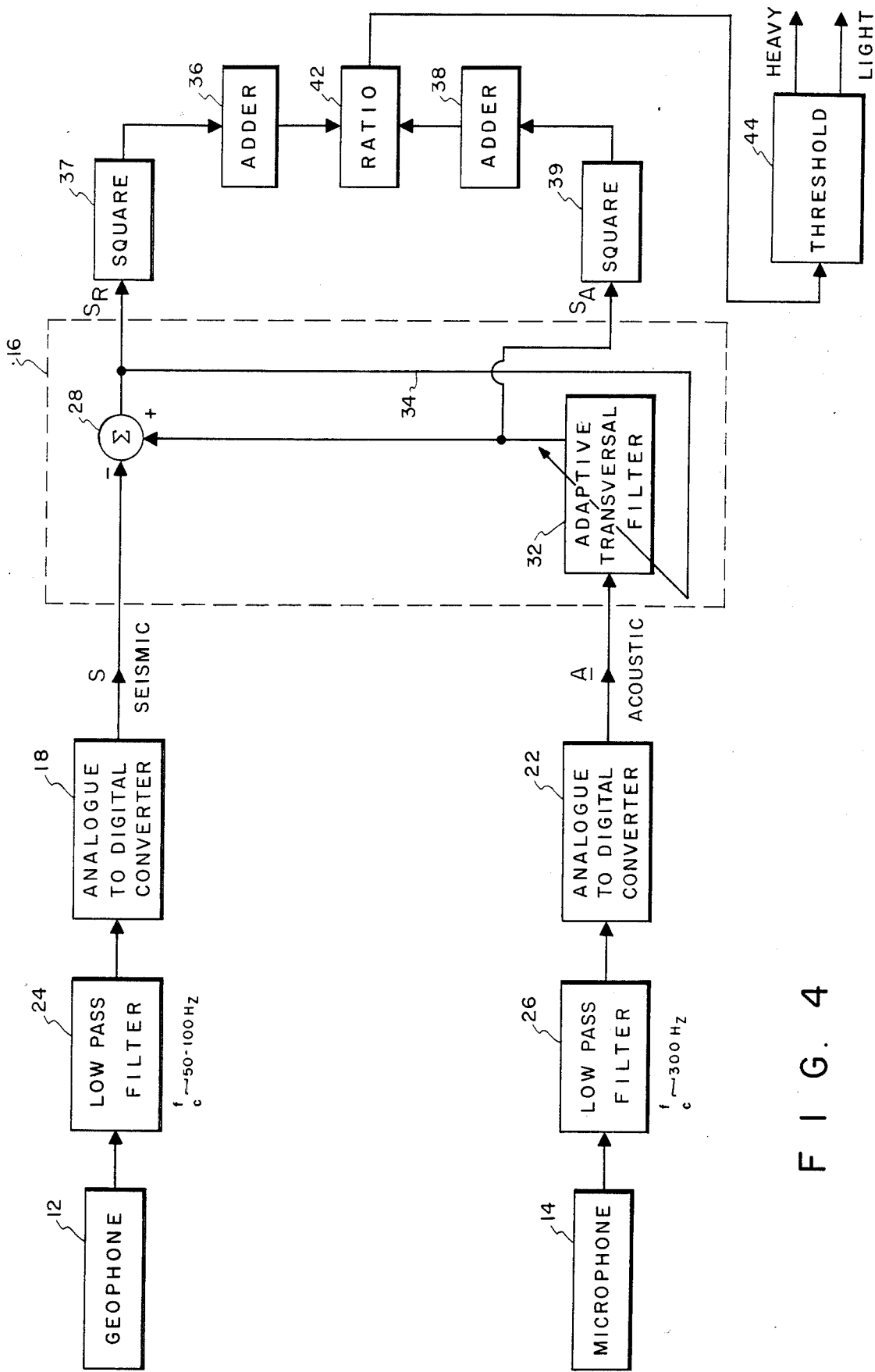
FIG. 4 is a block diagram of a system in accordance with this invention for classifying vehicles.

FIG. 4 illustrates one embodiment of invention. A geophone 12 and a microphone 14 are placed in close proximity to each other so that they receive respectively the seismic (S) and acoustic (A) wave energy generated by a moving vehicle or object to be classified as heavy or light. Any suitable geophone and microphone known in the art may be used in the practice of this invention.

As will be appreciated by those skilled in the art, the sensors 12 and 14 respond only to the total seismic signal S, and the total acoustic signal A. With reference to FIG. 1, the transfer function H(z) is unknown; hence the magnitude of the Rayleigh seismic component and the acoustically coupled seismic component of the total seismic signal are unknown. In order to determine the ratio of the Rayleigh seismic component and the acoustically coupled seismic component, the total seismic signal and the total acoustic signal are correlated.

The output of the geophone 12 is coupled to a low pass filter 24 whose output in turn is coupled to an analog to digital converter 18, which advantageously samples the analog signal at the Nyquist rate. The low pass filter 24 has a cutoff frequency in the range of 50-100 hertz. The digital output signal of converter 18 representative of the seismic wave energy, is coupled to an adaptive signal separator 16 which correlates the seismic signal with the acoustic signal in order to separate the seismic signal into its Rayleigh and acoustically coupled components.

Similarly, the output of the microphone 14 is coupled to a low pass filter 26 whose output in turn is coupled to an analog to digital converter 22 which samples this signal at the Nyquist rate. The low pass filter 26 advantageously has a cutoff frequency in the range of 300 hertz. The output of this filter is also coupled as an input to the adaptive signal separator 16 and constitutes a signal proportional to the acoustic energy falling on the microphone 14 from the vehicle or object of interest.

The preferred embodiment the adaptive signal separator 16 is based upon the Widrow-Hoff algorithm and provides a least-mean-square estimate of the seismic Rayleigh wave ($S_R$) and the seismic acoustically coupled wave ($S_A$). The algorithm is explained in detail in an article entitled "Adaptive Noise Cancellation: Principles and Applications", by Widrow, et.al, proceeding IEEE, Volume 63, pages 1692-1716. December 1975.

One implementation of signal separator 16 includes a summing junction 28, an adaptive transversal filter 32, and a feedback path 34 between the junction 28 and the filter 32. As will be explained in more detail in connection with FIG. 5, under steady state conditions the output of the adaptive transversal filter converges, in a mean-square-sense, to that component of the seismic signal which is most closely correlated with the acoustic signal A; that is the acoustically coupled seismic $S_A$.

Briefly, the transversal filter 32 successively delays the digital acoustic signal derived from microphone 14 to produce a series of N past values of the acoustic signal. A series of factors of variable weights are derived from these feedback signals and applied to these past values so that the error or feedback signal, which adaptively updates the variable factors, is minimized. The Widrow-Hoff algorithm is an efficient way to correlate these signals. That is, if $X_j$ is the vector of delayed samples of the acoustic signal at step j of the iteration and the variable weight vector at steps j and j+1 are given by w(j) and w (j+1) the recursive algorithm is: $w(j+1) = w(j) + 2 \mu E_j X_j$, where $\mu$ is a speed of convergence parameter. As will be appreciated by those skilled in the art, and from the following detailed description of FIG. 5, the function of the filter 32 is to pick out the component of the total seismic signal S which most closely correlates with the acoustic signal A. It will be appreciated that as the input to the summing junction 28 from the filter 32 approaches $S_A$ the output will be a minimum value and approach $S_R$.

The output of the summing junction 28 $S_R$ is squared by squaring circuit 37 and integrated in adder 36; similarly the signal $S_A$ is also squared by circuit 39 and integrated by adder 38.

Ratio circuit 42 compares the sum in adder 36 with the sum in adder 38 and its output is coupled to a threshold detector 44. If the ratio of $S_R$ to $S_A$ exceeds a predetermined threshold the vehicle is classified as heavy and if it does not it is classified as light.

Figure 5:
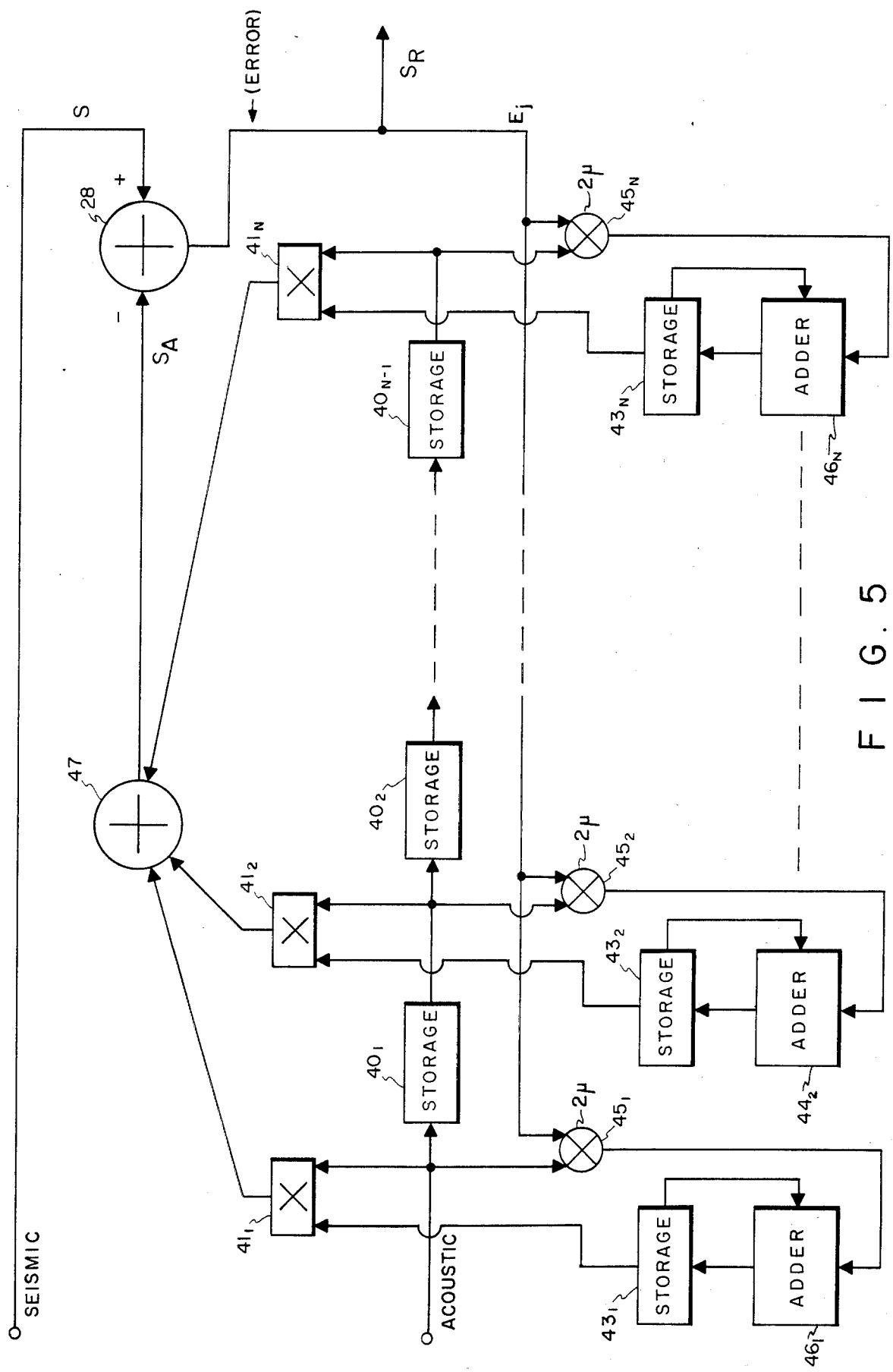
FIG. 5 is a block diagram of one embodiment of an adaptive transversal filter for use in the system of FIG. 4.

The operation of the adaptive transversal filter may be more readily understood with reference to FIG. 5. It will be appreciated that clocking and timing circuitry, which is well known in the art, has been omitted here and in FIG. 4 for the purpose of clarity. While the signal separator, integrators, ratio circuits and threshold detectors have been explained in terms of discrete components, in order to facilitate an understanding of the invention, it will be appreciated that these steps may be carried out by means of digital computer if desired. A profile of the amplitude of the acoustic signal A at N−1 successive discrete time intervals are stored in registers $40_1$ through $40_{n-1}$. Typically there would be on the order of 10 to 20 registers 40.

Referring now to FIG. 5, as well as FIG. 4, the filter conveniently comprises a series of registers 40 for storing digitally N−1 successive values of the acoustic signal A. As mentioned above, typically N is on the order of 10-20. A series of digital multipliers 41 combine N values of the acoustic signal with variable weighting factors developed in a series of storage registers $43_1$ through $43_N$.

The respective value of the weighting factor stored in each register 43 is a function of the present stored value of the acoustic signal A in associated register 40, the feedback error signal held back from the summing junction 28 via a respective one of a series of multipliers 45, which introduces constants $\mu$ into both the signal and present value of the acoustics signal A, and the previous value of the weighting factor in the register 43. A series of adders $46_1$ through $46_N$ combine each successive value of the acoustic signal, as modified by the feedback signal, with the value previously stored in the registers 43. The output of each of the multipliers 41 is coupled to a summing junction 47 whose output approaches $S_A$ as the error signal approaches $S_R$.

In operation, the registers 43 initially may be set to any arbitrary value. Successive applications of the Widrow-Hoff algorithm, as implemented in FIG. 5, for example, will result in variations in the output of summing junction 47 until the product of summing junction 28 reaches a steady state value. This steady state value will result in minimum feedback signal. Since $S = S_A + S_R$ this condition is reached when the output of summing junction 47 equals $S_A$ and the feedback signal equals $S_R$. Typically, in 150 to 200 cycles the output of the summing junction 47 will reach a steady state value at which it approaches $S_A$ and the feedback approaches $S_R$.

A typical clock rate (the clocking circuitry has been omitted for clarity) is about 1 kilohertz. If there is a large variance for S and A a large value of $\mu$ is desirable, and if there is a small signal variance a small value of $\mu$ is appropriate. When steady state is achieved the circuitry previously described in connection with FIG. 4 for taking the ratio of the mean square values of $S_R$ and $S_A$ is activated by a suitable clock signal. The output of the ratio circuit 42 is coupled to the threshold detector 44 in order to classify the vehicle as heavy or light.

Those skilled in the art will recognize that only preferred embodiments of the present invention is disclosed herein and that the embodiment may be altered and modified without departing from the true spirit and scope of the invention as defined in the accompanying claims.

What is claimed is:

1. A system for classifying a terrestrial moving object as either heavy or light, comprising in combination:

means for detecting a seismic signal generated by said object;

means for separating said seismic signal into a signal component which is a function of the Rayleigh component of the seismic signal and a signal component which is a function of the acoustically coupled component of the seismic signal; and means responsive to the relative magnitudes of said Rayleigh and acoustically coupled seismic component signals for classifying said terrestrial moving object as either relatively heavy or relatively light.

2. A system for classifying a terrestrial moving object as either heavy or light, comprising in combination:

means for detecting a seismic signal generated by said object;

means for detecting an acoustic signal generated by said object;

means responsive to said seismic signal and said acoustic signal for separating said seismic signal into a signal component which is a function of the Rayleigh component of the seismic signal and a signal component which is a function of the acoustically coupled component of the seismic signal; and means responsive to the relative magnitudes of said Rayleigh and acoustically coupled seismic component signals for classifying said terrestrial moving object as either heavy or relatively light.

* * * * *

UNITED STATES PATENT AND TRADEMARK OFFICE
CERTIFICATE OF CORRECTION

PATENT NO. : 4,604,738

DATED : AUGUST 5, 1986

INVENTOR(S) : RAJ AGGARWAL, ET AL.

It is certified that error appears in the above-identified patent and that said Letters Patent is hereby corrected as shown below:

In column 6, line 14, delete "relatively"

(first and second occurrences).

In column 6, line 31, delete "relatively".

Signed and Sealed this
Second Day of December, 1986

Attest:

DONALD J. QUIGG

Attesting Officer

Commissioner of Patents and Trademarks